United States Patent
Nakagome et al.

(10) Patent No.: US 9,679,383 B2
(45) Date of Patent: Jun. 13, 2017

(54) DISPLAY CONTROL APPARATUS DISPLAYING IMAGE

(71) Applicant: CASIO COMPUTER CO., LTD., Shibuya-ku, Tokyo (JP)

(72) Inventors: Kouichi Nakagome, Saitama (JP); Yoshihiro Kawamura, Tokyo (JP); Tomohiko Murakami, Tokyo (JP); Yuichi Onumata, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/220,801

(22) Filed: Mar. 20, 2014

(65) Prior Publication Data
US 2014/0286619 A1    Sep. 25, 2014

(30) Foreign Application Priority Data
Mar. 22, 2013  (JP) ................................ 2013-061074

(51) Int. Cl.
| | | |
|---|---|---|
| H04N 9/12 | (2006.01) | |
| H04N 7/12 | (2006.01) | |
| H04N 11/02 | (2006.01) | |
| H04N 7/18 | (2006.01) | |
| G06T 7/00 | (2017.01) | |
| H04N 5/445 | (2011.01) | |
| H04N 21/81 | (2011.01) | |
| H04N 9/88 | (2006.01) | |
| H04N 5/84 | (2006.01) | |

(Continued)

(52) U.S. Cl.
CPC ....... *G06T 7/0048* (2013.01); *H04N 5/44543* (2013.01); *H04N 21/8153* (2013.01); *H04N 2005/44556* (2013.01)

(58) Field of Classification Search
USPC ........ 348/383, 406.1, 405.1, 61, 63, 289.99; 386/263; 345/156, 175
See application file for complete search history.

(56) References Cited

U.S. PATENT DOCUMENTS

| | | | |
|---|---|---|---|
| 5,954,650 A | 9/1999 | Saito et al. | |
| 6,514,081 B1 * | 2/2003 | Mengoli | ....................... 434/252 |

(Continued)

FOREIGN PATENT DOCUMENTS

| | | |
|---|---|---|
| CN | 102469270 A | 5/2012 |
| JP | 07038884 A | 2/1995 |

(Continued)

OTHER PUBLICATIONS

Japanese Office Action dated Feb. 3, 2015, issued in counterpart Japanese Application No. 2013-061074.

(Continued)

*Primary Examiner* — Daquan Zhao
(74) *Attorney, Agent, or Firm* — Holtz, Holtz & Volek PC

(57) ABSTRACT

An image capture apparatus 1 is equipped with: a CPU 11 that acquires a plurality of images; a normalization unit 54 that performs normalization such that an area of at least one of a plurality of acquired images satisfies a predetermined criterion; and a display control unit 56 that performs control such that a plurality of images including the images normalized by the normalization unit 54 are displayed in an output unit 19.

18 Claims, 13 Drawing Sheets

(51) Int. Cl.
*G09G 5/00* (2006.01)
*G06F 3/042* (2006.01)

(56) References Cited

U.S. PATENT DOCUMENTS

| | | | |
|---|---|---|---|
| 7,367,887 B2 * | 5/2008 | Watabe | A63F 13/10 |
| | | | 463/36 |
| 8,675,021 B2 | 3/2014 | Reusens et al. | |
| 9,407,804 B2 | 8/2016 | Kawai et al. | |
| 2002/0001449 A1 | 1/2002 | Sato et al. | |
| 2007/0242879 A1 | 10/2007 | Suzuki et al. | |
| 2010/0189364 A1 * | 7/2010 | Tsai et al. | 382/209 |
| 2012/0105657 A1 | 5/2012 | Yokohata et al. | |
| 2013/0088426 A1 * | 4/2013 | Shigeta et al. | 345/156 |
| 2013/0181948 A1 * | 7/2013 | Sakai | 345/175 |

FOREIGN PATENT DOCUMENTS

| | | |
|---|---|---|
| JP | 08196677 A | 8/1996 |
| JP | 10137190 A | 5/1998 |
| JP | 10-304299 A | 11/1998 |
| JP | 2000184369 A | 6/2000 |
| JP | 2004500756 A | 1/2004 |
| JP | 2004275779 A | 10/2004 |
| JP | 2007288555 A | 11/2007 |
| JP | 2010127639 A | 6/2010 |
| JP | 2010130086 A | 6/2010 |
| JP | 2011109557 A | 6/2011 |
| JP | 2012034146 A | 2/2012 |

OTHER PUBLICATIONS

Korean Office Action dated Feb. 4, 2015, issued in counterpart Korean Application No. 10-2014-0033738.

Japanese Office Action (and English translation thereof) dated Aug. 18, 2015, issued in counterpart Japanese Application No. 2013-061074.

Chinese Office Action (and English translation thereof) dated Nov. 23, 2016, issued in counterpart Chinese Application No. 201410108524.2.

Japanese Office Action (and English translation thereof) dated Mar. 14, 2017, issued in counterpart Japanese Application No. 2016-088669.

* cited by examiner

FIG. 9
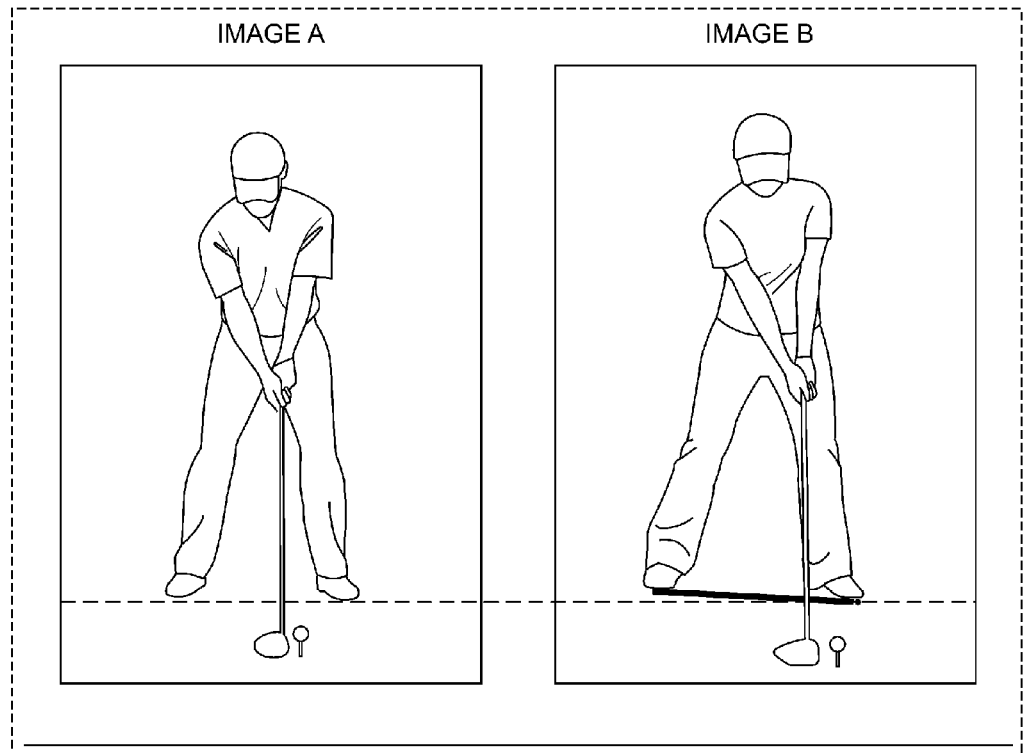
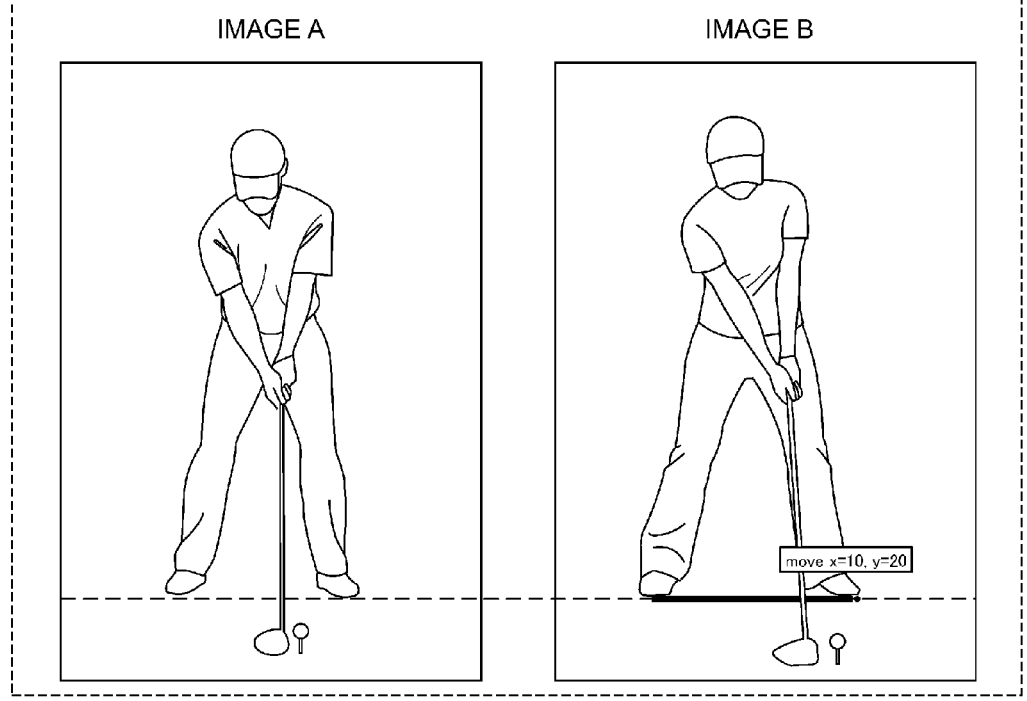

FIG. 11
IMAGE A  IMAGE B
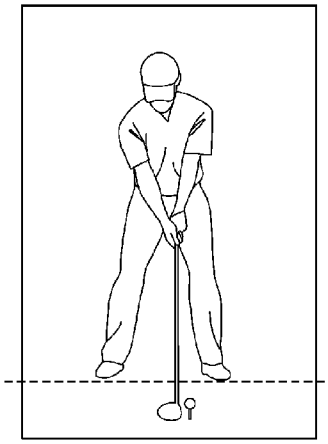 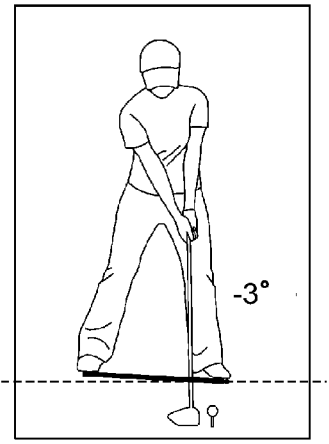
IMAGE A  IMAGE B
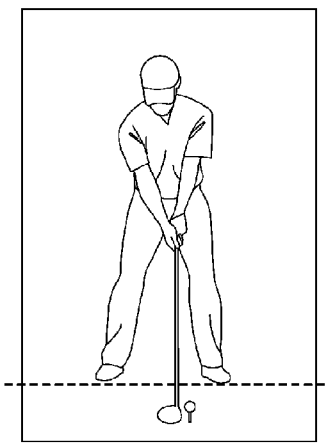 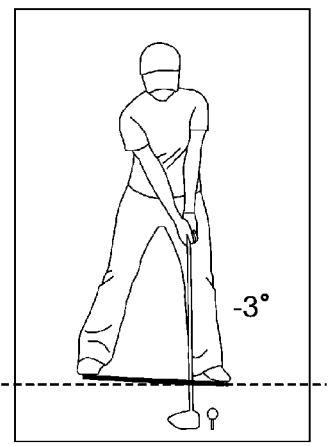
IMAGE A  IMAGE B
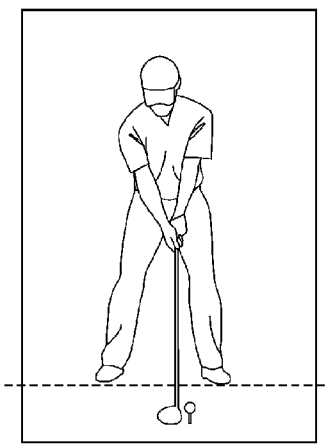 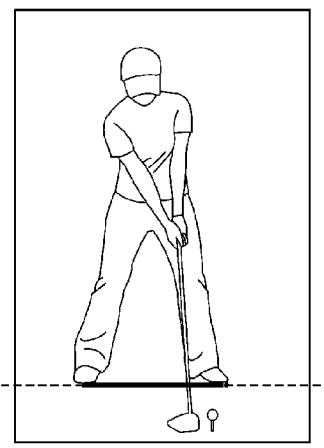

DISPLAY CONTROL APPARATUS DISPLAYING IMAGE

This application is based upon and claims the benefit of priority from the prior Japanese Patent Application No. 2013-061074, filed Mar. 22, 2013, and the entire contents of which are incorporated herein by reference.

BACKGROUND OF THE INVENTION

Field of the Invention

The present invention relates to a display control apparatus for displaying an image, a display control method, and a storage medium.

Related Art

As a conventional technology, in Japanese Unexamined Patent Application Publication No. 10-304299, a technology is disclosed which simultaneously reproduces a plurality of separately recorded moving images through multiple displays with matching reproduction timings.

SUMMARY OF THE INVENTION

An aspect of a display control apparatus according to the present invention is a display control apparatus, including:

an acquisition unit that acquires a plurality of images;

a normalization unit that performs normalization such that an area of at least one of a plurality of images acquired by the acquisition unit satisfies a predetermined criterion; and a display control unit that displays the images normalized by the normalization unit in a display unit.

Furthermore, an aspect of a display control method according to the present invention is a display control method used by a display control apparatus, the display control method comprising:

acquiring a plurality of images;

performing normalization such that an area of at least one of the plurality of images acquired in the acquiring of the plurality of images satisfies a predetermined criterion; and display controlling, wherein the plurality of images including the images normalized by performing normalization are displayed in a display unit.

Moreover, an aspect of a non-transitory storage medium according to the present invention is a non-transitory storage medium on which a computer-readable program is recorded, the computer-readable program causing a computer to perform functions as:

an acquisition unit that acquires a plurality of images;

a normalization unit that performs normalization such that an area of at least one of the plurality of images acquired by the acquisition unit satisfies a predetermined criterion; and a display control unit that displays the plurality of images including the images normalized by the normalization unit in a display unit.

BRIEF DESCRIPTION OF THE DRAWINGS

FIG. 9 is a schematic diagram that illustrates an example of a technique for performing the normalization of an image.

FIG. 11 is a schematic diagram that illustrates an example of a technique for performing the normalization of an image.

DETAILED DESCRIPTION OF THE INVENTION

Hereinafter, an embodiment of the present invention will be described with appropriate reference to the drawings.

Figure 1:
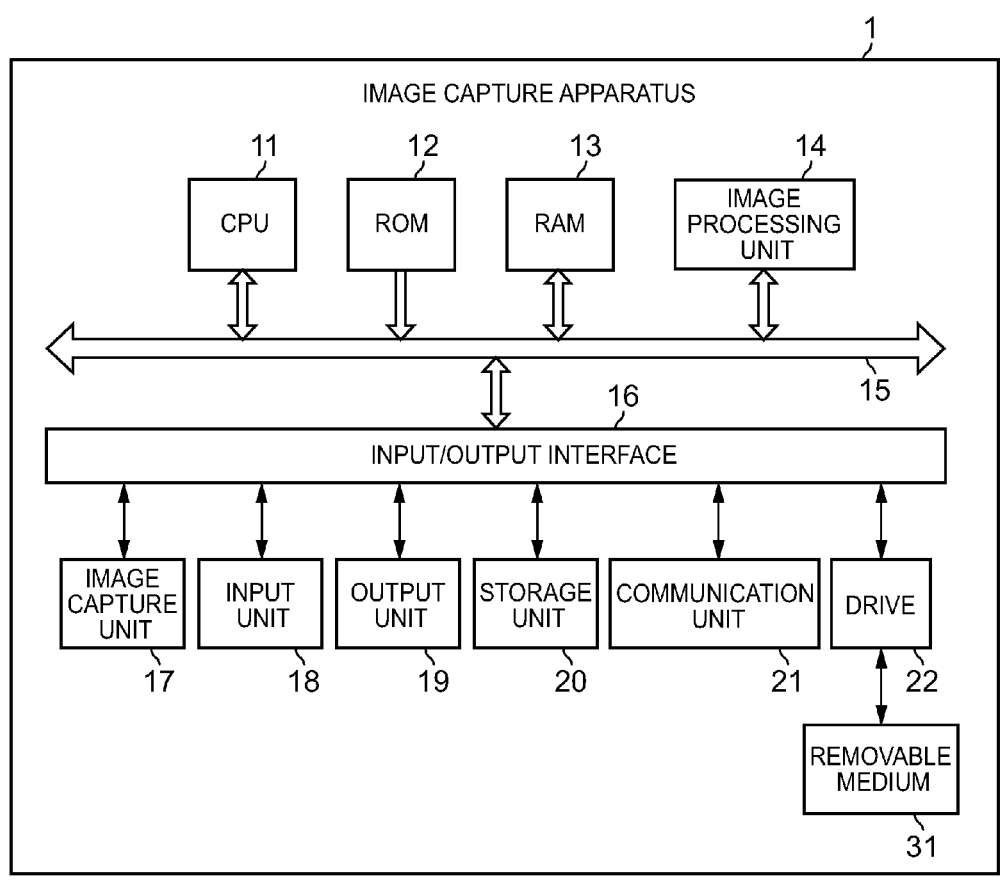
FIG. 1 is a block diagram that illustrates the hardware configuration of an image capture apparatus in relation to a display control apparatus, according to an embodiment of the present invention.

FIG. 1 is a block diagram that illustrates the hardware configuration of an image capture apparatus 1 in relation to a display control apparatus, according to an embodiment of the present invention. For example, the image capture apparatus 1 is configured as a digital camera.

The image capture apparatus 1 is equipped with a central processing unit (CPU) 11; a read only memory (ROM) 12; a random access memory (RAM) 13; an image processing unit 14; a bus 15; an input/output interface 16; an image capture unit 17; an input unit 18; an output unit 19; a storage unit 20; a communication unit 21; and a drive 22.

The CPU 11 performs various processes in accordance with a program recorded in the ROM 12 or a program loaded from the storage unit 20 into the RAM 13.

In addition, within the RAM 13, the data necessary for the CPU 11 to perform various processes and the like are appropriately stored.

The image processing unit 14 is configured by a digital signal processor (DSP), a video random access memory (VRAM), and the like and, in cooperation with the CPU 11, performs various image processes with respect to the data of an image.

The CPU 11, the ROM 12, and the RAM 13 are interconnected through the bus 15. Additionally, the input/output interface 16 is connected to this bus 15. The image capture unit 17, the input unit 18, the output unit 19, the storage unit 20, the communication unit 21, and the drive 22 are connected to the input/output interface 16.

The image capture unit 17 includes an optical lens unit and an image sensor (not illustrated).

In order to photograph a subject, the optical lens unit is configured by a lens such as a focus lens and a zoom lens for condensing light. The focus lens is a lens for forming an image of a subject on the light receiving surface of the image sensor. The zoom lens is a lens that causes the focal length to freely change in a certain range. The optical lens unit also includes peripheral circuits to adjust setting parameters such as focus, exposure, white balance, and the like, as necessary.

The image sensor is configured by an optoelectronic conversion device, an AFE (Analog Front End), and the like. The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 17.

Such an output signal of the image capture unit 17 is hereinafter referred to as "data of a captured image". Data of a captured image is supplied to the CPU 11, the RAM 13, the image processing unit 14, etc. as appropriate.

The input unit 18 is configured by a touch panel laminated on a display screen of the output unit 19 which is configured by a display, and inputs various kinds of information in accordance with a user's operation instructions. In addition, the input unit 18 is configured by various buttons and the like and inputs various kinds of information in accordance with a user's operation instructions.

The output unit 19 is configured by a display, a speaker, or the like, and outputs an image or a voice.

The storage unit 20 is configured by a hard disk, a dynamic random access memory (DRAM), or the like, and stores data of various images.

The communication unit 21 controls communication with the other apparatuses (not illustrated in the figure) through networks, including the Internet.

In the drive 22, a removable medium 31 configured by a magnetic disk, an optical disc, a magneto-optical disk, or semiconductor memory is mounted, as is appropriate. A program that is read out from the removable medium 31 by the drive 22 is installed in the storage unit 20 as is necessary. In addition, similar to the storage unit 20, the removable medium 31 can store various kinds of data, such as the data of an image stored in the storage unit 20 and the like.

Hereinafter, the image capture apparatus 1 of the present embodiment, which possesses the function, will be described.

Figure 2:
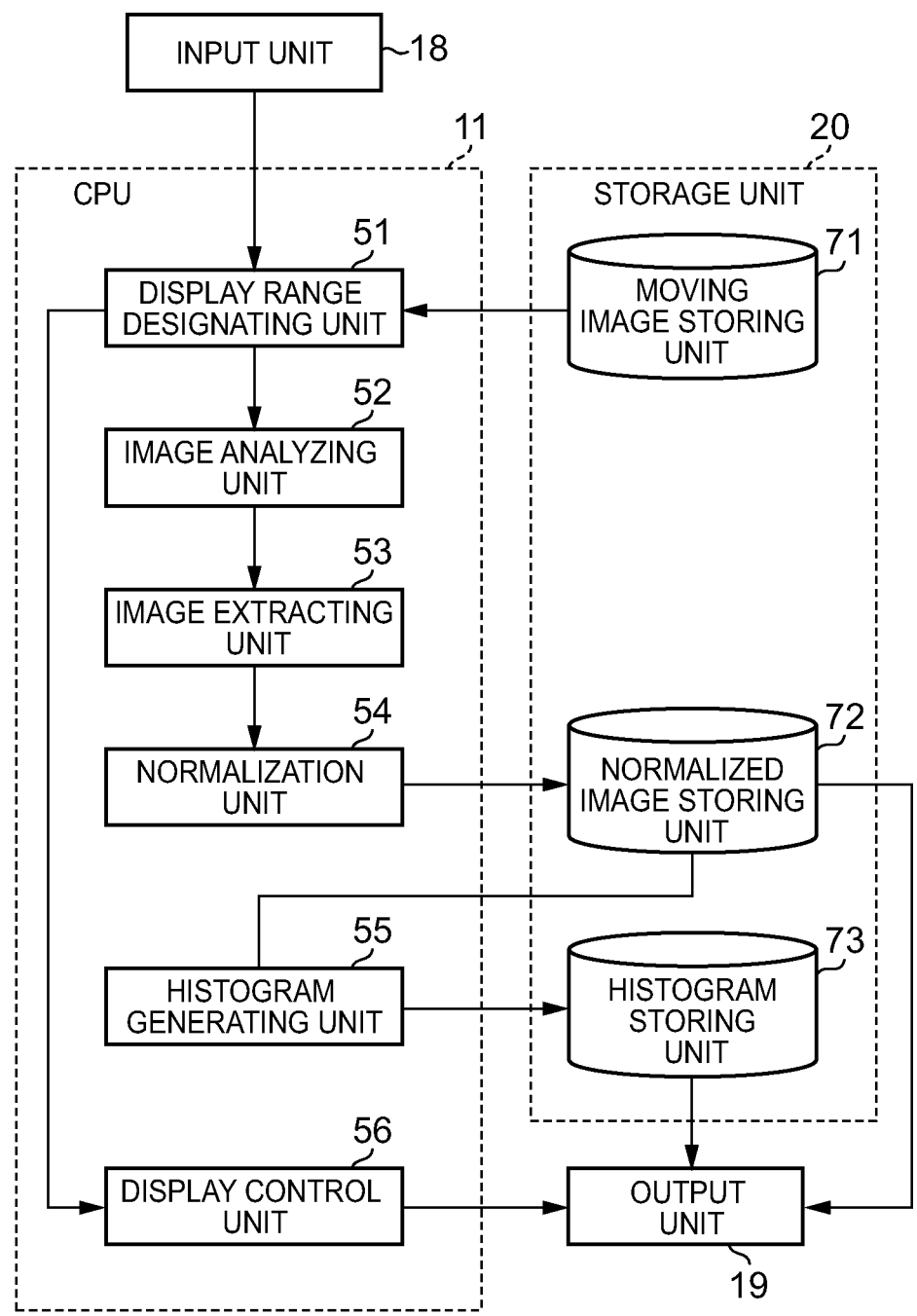
FIG. 2 is a functional block diagram that illustrates a functional configuration used for performing a slide show display process, among the functional configurations of the image capture apparatus.

FIG. 2 is a functional block diagram that illustrates a functional configuration used for performing a slide show display process among the functional configurations of the image capture apparatus 1.

Here, the "slide show display process" refers to a series of processes up to adjusting images extracted from a moving image selected from a plurality of stored moving images to a predetermined size and sequentially displaying the adjusted images for swing operations. Hereinafter, the sequential display of images for predetermined operations will be referred to as "slide show display". In this embodiment, in which, as an example, a moving image acquired by photographing a golf swing is targeted for display, by displaying images, including operations representing a series of swing movements along the time axis, the slide show display is performed.

Here, the "series of movements of a swing" is an operation that includes each movement of a swing, such as the address, take-back, top position, impact, follow-through, and finish and the like.

In the case where the slide show display process is performed, in the CPU 11, a display range designating unit 51, an image analyzing unit 52, an image extracting unit 53, a normalization unit 54, a histogram generating unit 55, as well as a display control unit 56 are included.

It is not particularly necessary for the functions of the display range designating unit 51, the image analyzing unit 52, the image extracting unit 53, the normalization unit 54, the histogram generating unit 55, and the display control unit 56 to be installed in the CPU 11, though they have been installed therein in the present embodiment. Moreover, at least a portion of such functions may be assigned to the image processing unit 14.

In one area of the storage unit 20, a moving image storing unit 71, a normalized image storing unit 72, and a histogram storing unit 73 are provided.

The moving image storing unit 71 stores the data of moving images such as a moving image photographed by the image capture unit 17, and a moving image acquired externally through the communication unit 21 or the like. In the present embodiment, the data of a moving image acquired by photographing a golf swing from the front side is stored in the moving image storing unit 71. More specifically, in the moving image storing unit 71, a plurality of units of data of moving images acquired by photographing golf swings from the front side are stored. Such data has photographing times, photographing places, and target swingers that vary from one another.

Within the normalized image storing unit 72, data of images (hereinafter, referred to as "normalized images") acquired by correcting state images extracted from a moving image in accordance with a predetermined rule are stored. More specifically, the normalized image storing unit 72 stores the data of normalized images that were corrected in such a manner that subjects, such as the target swinger, are the same size. In addition, in the normalized image storing unit 72, the data of normalized images extracted from a moving image, in which a plurality of swing operations are identified, is managed and stored for each moving image. Furthermore, in the header of the data of the normalized image, various kinds of information relating to a swing is added. As the information relating to a swing, in the header information, information such as the moving image's photographing date and time, targeted swinger's name, club type, average club head speed, ball speed, and swing movement and the like are included. Such information is added by being automatically input through an image analysis or by being input by a user. In this embodiment, the swing information to be added is an item that is used for searching a normalized image.

In the histogram storing unit 73, data of a histogram that is generated based on the information of a swing that is acquired as a result of the moving image analysis and the information of a swing that is input by a user, is stored. The histogram is stored in association with a normalized image stored in the normalized image storing unit 72.

The display range designating unit 51 designates a moving image (hereinafter, referred to as a "target moving image") that is a target for the slide show display from among all the moving images stored in the moving image storing unit 71. The display range designating unit 51 designates a target moving image, for example, the name of each target swinger and each club type, for each photographing period. The user designates a condition of the range of the target moving image through the input unit 18. Based on the result thereof, the display range designating unit 51 designates the target moving image.

Figure 3:
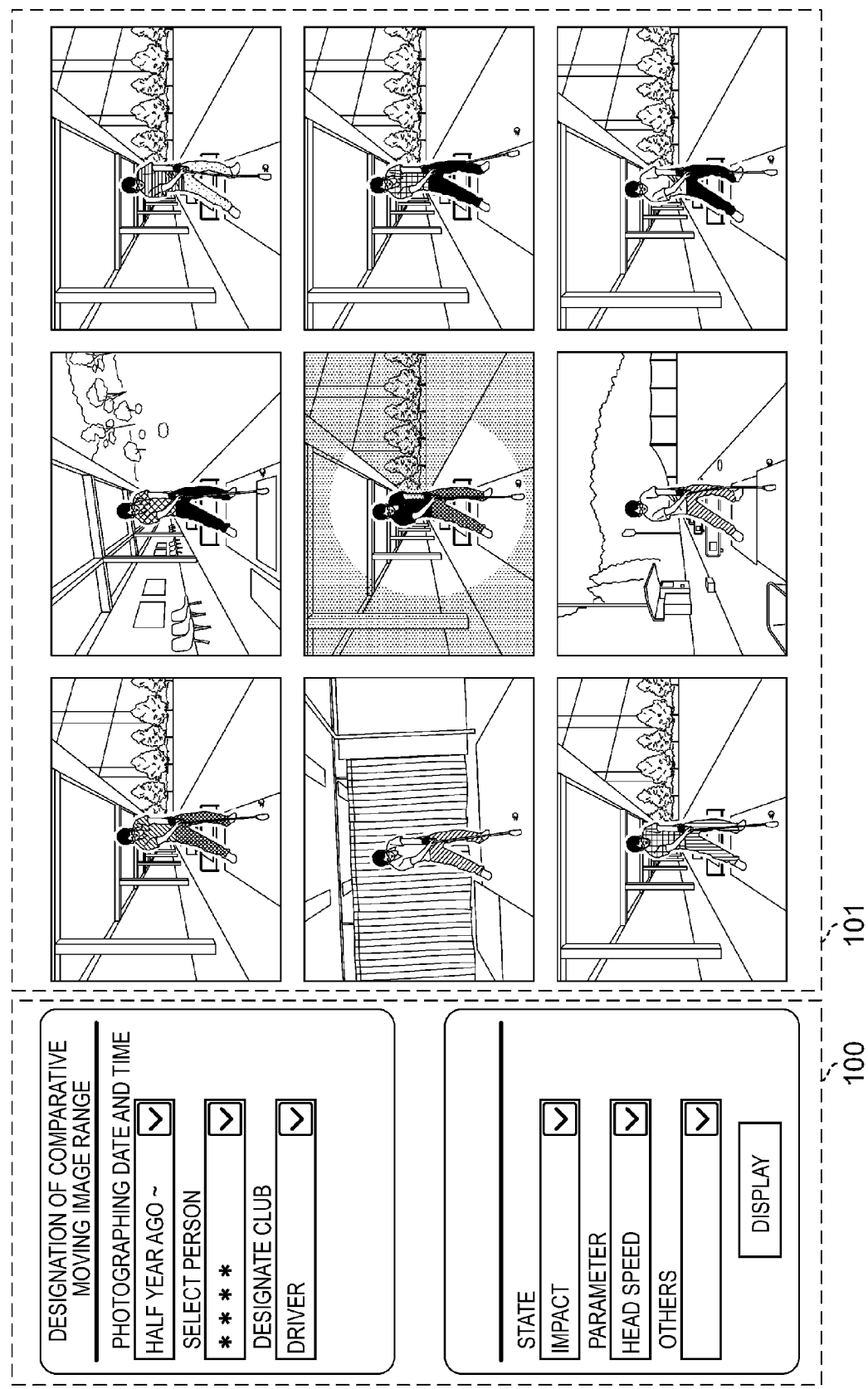
FIG. 3 is a diagram that illustrates an example of the display of an output unit that is displayed by the slide show display process.

FIG. 3 is a diagram that illustrates an example of the display of the output unit 19 that is displayed by the slide show display process.

On the display screen, a field 100 of "comparative moving image range designation" and a field 101 of "list display" are arranged.

In the field 100 of "comparative moving image range designation", items that are search keys of an image displayed in the field 101 of "list display" are displayed, and the entry of each item is configured to be capable of being selected as a pull-down menu.

In the "photographing date and time" item, the photographing date and time can be selected. For instance, in this display example, moving images with generation periods ranging from a half year ago to the present are selected as "A half year ago . . . ".

In the "person selection" item, the name of a person that is a storage target of the moving image can be selected from the names of people.

In the "club designation" item, a club to be used can be selected. In this display example, a "driver" is selected.

In the "state" item, a swing state can be selected. In this display example, an "impact" is selected. In the field 101 of the "list display", a frame of a moving image that is to be displayed is designated.

In the "parameter" item, a selection item of the moving image, other than the items described above, can be selected. In this display example, a "head speed" capable of selecting a moving image in which the head speed of the club is high can be selected. In addition, the "parameter" item is used for the generation of a histogram.

Furthermore, in the field 100 of the "comparative moving image range designation", a "display" button used for giving an instruction for searching for a moving image using the above-described item is displayed. In this embodiment, by selecting this "display" button, a target moving image is designated using the conditions of the "photographing date and time", the "person selection", the "club designation", and the "state".

Here, in this embodiment, while the target moving image has been described as being automatically designated by selecting the conditions of such items, the target moving image may be arbitrarily designated by the user.

In addition, in the field 101 of the "list display", a plurality of moving images which were retrieved using the condition designated in the field 100 of the "comparative moving image range designation" are displayed.

In this display example, as a result of the search using the above-described condition, nine 3×3 images are displayed. In addition, in this display example, since the "impact" is designated in the "state" item, frame images of the retrieved moving images, including the "impact", are displayed.

With regard to the order of display, moving images are displayed in ascending order according to the photographing date and time of each moving image. Nevertheless, the display may be arranged using various methods, for example, it may be configured such that the display is arranged by the descending order of the "head speed" that is selected in the item.

In other words, in the field 101 of the "list display", the moving images that result from the search performed based on the item designated in the field 100 of the "comparative moving image range designation" are displayed according to the order of the photographing date and time, and a frame of each of the moving images that corresponds to the designated state is displayed.

Referring back to FIG. 2, the image analyzing unit 52 performs an image analysis of the target moving image and identifies a frame image, including the predetermined movement of a swing inside the moving image, or it identifies the position of a subject (a ball or a target swinger) included in the moving image.

In addition, various techniques are used for the analysis of images, for example, a swing can be identified based on changes in the position of a target swinger, the position of a ball, and the position of a club. In other words, for a swing, an address operation, a take-back operation, and a top position can be identified in accordance with the position of the target swinger, the position of the ball, and the transition of the club, and an impact, a follow-through, and a finish can be identified in accordance with the position of the target swinger, the presence/absence of the ball, and the transition of the club. In addition, the head position of the target swinger can be identified by using a known face recognition technology or the like.

Furthermore, the position of the ball may be configured to be restricted by displaying a mark in a live view display at the time of photographing and matching the ball to the mark.

In addition, the position of the head of the target swinger and the position of the ball may be identified by the user's designation of the position without being automatically determined through an analysis of the image.

The image extracting unit 53 extracts images (hereinafter, referred to as "state images") of predetermined operation states of a swing from a moving image designated by the display range designating unit 51. In other words, the image extracting unit 53 extracts a plurality of state images, including predetermined operations, from one moving image.

The normalization unit 54 generates normalized images by making corrections (hereinafter, referred to as "normalization") in order to change the state images extracted by the image extracting unit 53 in accordance with a predetermined rule. In this embodiment, the normalization unit 54 normalizes the sizes of all the state images such that the distance between the position of the ball and the position of the target swinger's head area is a predetermined distance with reference to the state images of an operation of an impact. Accordingly, between images to be compared with each other, a difficulty in comparison due to differences in photographing conditions, such as the distance between the camera and the subject, or the differences in the physiques of the target swingers, can be suppressed. Thus, the differences other than points to be corrected for a proper comparison between images become more marked, and it becomes easy for such differences to be recognized by the user.

In addition, other than the corrections for changing the sizes in accordance with a predetermined rule, the normalization unit 54, for example, may make corrections for changing the images in accordance with a predetermined rule or make corrections for changing the position of the subject within each image in accordance with a predetermined rule.

As above, the normalization unit 54 can normalize elements to be compared with each other in the state images that were acquired by extracting postures at the time of performing an operation of the swing of the target swinger from each moving image.

Figure 4:
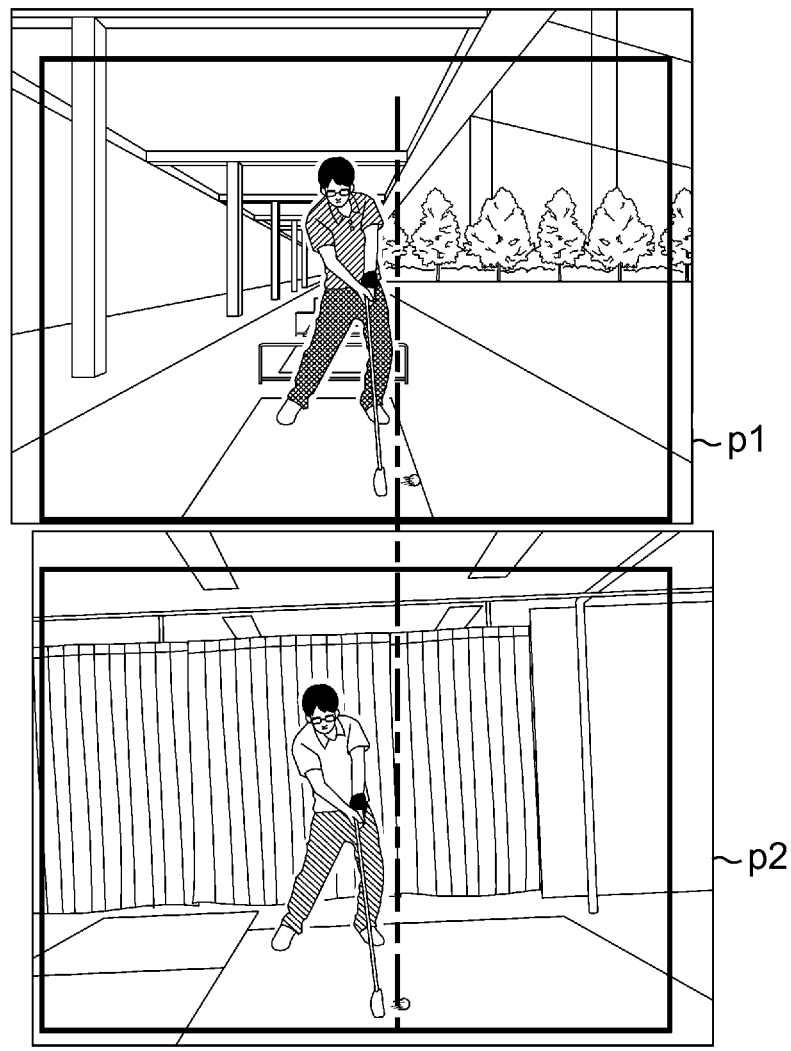
FIG. 4 is a schematic diagram that illustrates an example of the normalization of a state image.

FIG. 4 is a schematic diagram that illustrates an example of the normalization of a state image.

For example, since the positions of the target swingers are different from each other due to a difference in the photographing position between state images p1 and p2, normalization of the state images, as illustrated in FIG. 4, is performed such that the target images, which have differing photographing positions, are displayed in the same position with the same size and at the same angle.

In the example in FIG. 4, as denoted by a dashed line, since the knee positions of the target swingers differ from each other in state images p1 and p2, in the normalization process, the positions of the target swingers are adjusted to coincide with each other. More specifically, the normalization unit 54 generates a normalized image by cutting out the image so as to allow the subject to be positioned in the center and to be of a size which fits the ball.

The normalization process illustrated in FIG. 4 may be regarded as image correction based on an absolute criterion.

Referring back to FIG. 2, the histogram generating unit 55 generates a histogram based on the result of the image analysis conducted by the image analyzing unit 52 and the swing information derived from information input by the user. In this embodiment, the histogram generating unit 55, as designated in FIG. 3, generates a histogram based on an average value of the head speeds of the club which were acquired as a result of the image analysis. In the histogram, the average value of the head speeds of the club in each one of the moving images stored in the moving image storing unit 71 is indicated as a bar graph in units of a predetermined speed, and a portion to which the normalized image belongs is indicated by being visually separated through color identification or the like.

Figure 5:
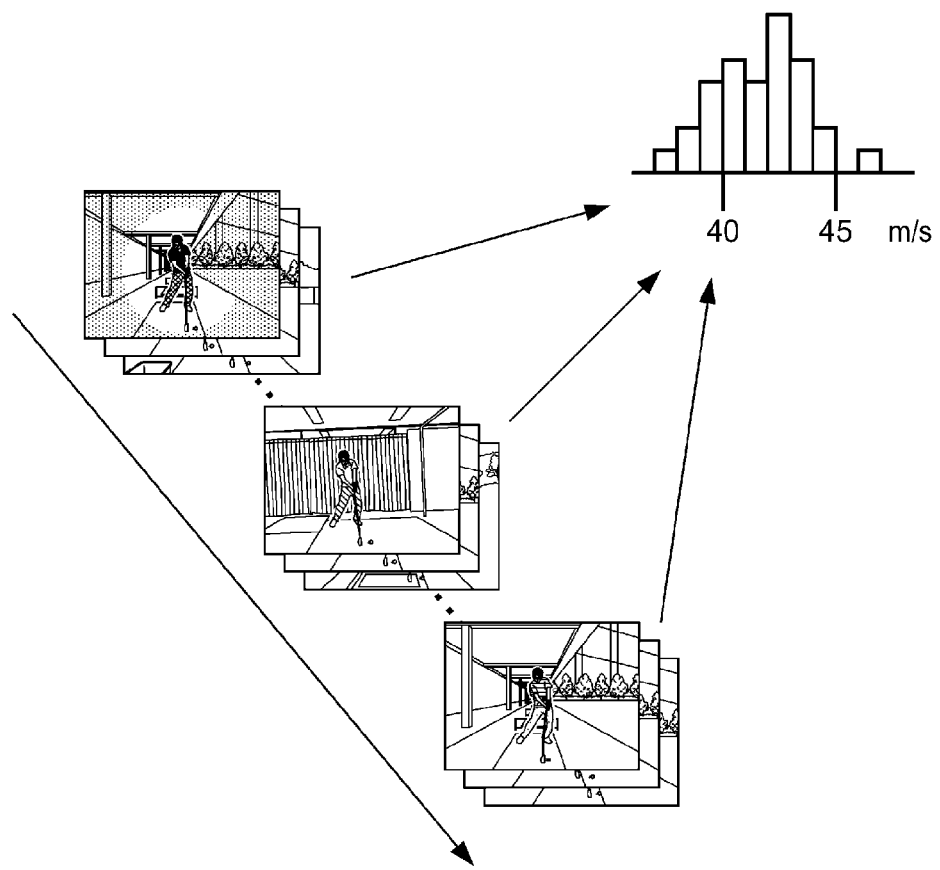
FIG. 5 is a schematic diagram that illustrates the generation of a histogram.

FIG. 5 is a schematic diagram that illustrates the generation of a histogram.

As illustrated in FIG. 5, the histogram generating unit 55 divides the target moving images for each head speed based on the result of the analysis of the target moving images and displays the number (frequency) of target moving images for each head speed as a histogram. In this embodiment, frequencies acquired by dividing the head speeds into 12 steps are indicated as a histogram. More specifically, in the histogram, frequencies are indicated in the form of bar graphs from "35 m/s" to "50 m/s" for every 1 m/s with the general head speed range being set as the center. In the histogram that sets all the target moving images as the target, a result of "frequency 1" at "38 m/s", "frequency 2" at "39 m/s", "frequency 4" at "40 m/s", "frequency 5" at "41 m/s", "frequency 6" at "42 m/s", "frequency 5" at "43 m/s", "frequency 7" at "44 m/s", "frequency 2" at "45 m/s", or "frequency 1" at "47 m/s" is displayed.

Referring back to FIG. 2, the display control unit 56 performs control of the output unit 19 so as to display a search result retrieved based on the condition designated by the display range designating unit 51 as a list. More specifically, the display control unit 56 performs control of the output unit 19 such that moving images retrieved using the condition designated in the field 100 of the "comparative moving image range designation" in FIG. 3 is displayed in the field 101 of the "list display" as a list.

In addition, the display control unit 56 controls the output unit 19 to perform the slide show display by sequentially displaying normalized images that are in the designated state, and are stored in the normalized image storing unit 72, at predetermined timings. At that time, the display control unit 56 controls the output unit 19 such that the slide show display of a histogram which corresponds to the normalized images displayed in the list among the histograms stored in the histogram storing unit 73 together with the normalized images, is performed.

Figure 6:
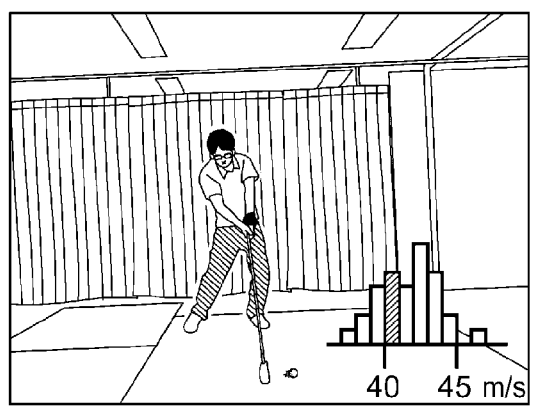
FIG. 6 is a diagram that illustrates an example of the display of a histogram, together with a normalized image.

FIG. 6 is a diagram that illustrates an example of the display of a histogram together with a normalized image.

In the example illustrated in FIG. 6, the histogram is displayed on the corner of the normalized image that is located on the lower right side. In the displayed histogram, the color of a range to which the normalized image belongs is displayed varyingly. Accordingly, the user can visually recognize the degree to which the displayed normalized image is evaluated among the target moving images. In other words, the degree to which a swing displayed in the normalized image is evaluated among all the normalized images.

Next, a slide show display process performed by the image capture apparatus 1 having the functional configuration illustrated in FIG. 2 will be described with reference to FIG. 7.

Figure 7:
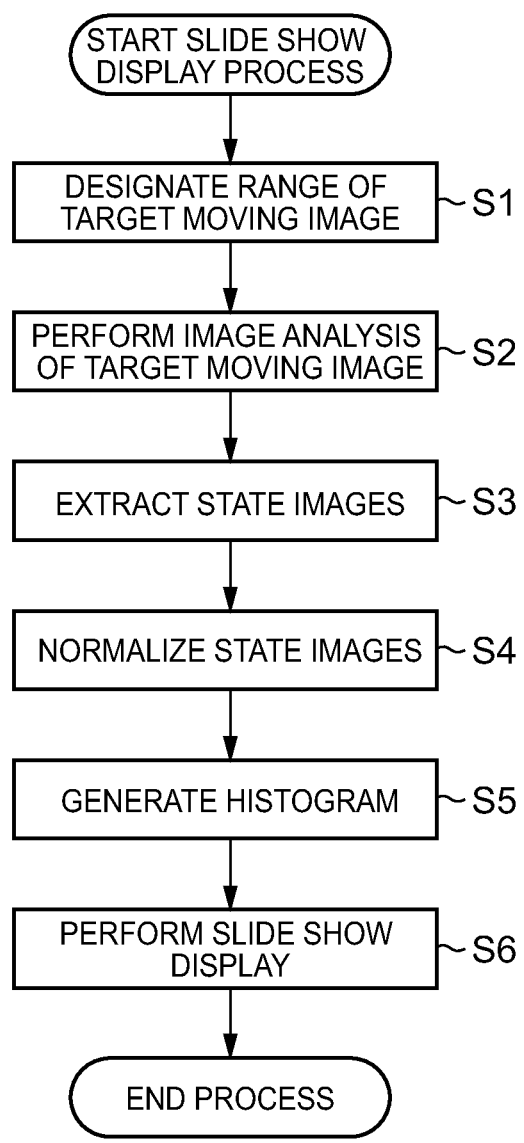
FIG. 7 is a flowchart that illustrates the flow of the slide show display process performed by the image capture apparatus in FIG. 1, with the functional configuration illustrated in FIG. 2.

FIG. 7 is a flowchart that illustrates the flow of the slide show display process performed by the image capture apparatus 1 in FIG. 1. It has the functional configuration illustrated in FIG. 2.

The slide show display process is started by being triggered upon a user's start operation of the slide show display process for the input unit 18.

In Step S1, target moving images are designated from among all the moving images that are stored in the moving image storing unit 71. The display range designating unit 51, for example, as illustrated in FIG. 3, designates a target moving image for each photographing timing, as well as the name of each target swinger, and each club type. The display range designating unit 51 designates a range to be extracted as a normalized image.

In Step S2, the image analyzing unit 52 analyzes the target moving images. In other words, the image analyzing unit 52 analyzes the target moving images that are designated by the display range designating unit 51. In this embodiment, by analyzing the moving images, the club head speed of the target moving image, the position of the ball of the target moving image, the position of the head of the target swinger of the target moving image, and the state images of the target moving image are identified.

In Step S3, the image extracting unit 53 extracts state images from the result of the analysis performed by the image analyzing unit 52. In other words, the image extracting unit 53 extracts the state images in which the operations of the target swinger are an address operation, a top position, an impact, a finish, and the like from the target moving image.

In Step S4, the normalization unit 54 normalizes the extracted state images. In other words, the normalization unit 54 makes a correction for matching the size, the angle, and the position of each state image for easy comparison of the images.

For example, the normalization unit 54, as illustrated in FIG. 4, makes a correction to allow the position of the target swinger in each state image to be located in the center of the image, such that the positions of the target swingers in the state images coincide with each other.

In Step S5, the histogram generating unit 55 generates a histogram that schematically represents the dispersion of predetermined parameters. The histogram generating unit 55 generates a histogram that displays which category of the calculated dispersion the parameters of each moving image state image that is a display target belong to by calculating the dispersion of each one of the moving images based on predetermined parameters acquired by analyzing each moving image.

In Step S6, the display control unit 56 performs a slide show display. In other words, the display control unit 56 performs a slide show display by sequentially switching the normalized image to each moving image. Accordingly, in the output unit 19, the images are sequentially displayed at predetermined timings. In addition, in the output unit 19, given that normalized images are displayed with the positions and the sizes of the subject target swingers having been uniformized, a difference between the operations is clarified, and the images can easily be compared with the other moving images for which the photographing conditions are different from those of the images.

Furthermore, when the slide show display is made, it may be configured such that a histogram corresponding to the displayed normalized image is displayed on the corner of the normalized image in an overlapping manner. In such case, more specifically, an image in which the histogram is arranged on the corner of the image, like that illustrated in the example in FIG. 6, is displayed.

In addition, in this embodiment, in the state in which the slide show display is made, as illustrated in FIG. 6, the histogram corresponding to the displayed normalized image is displayed on the corner of the normalized image in an overlapping manner.

Therefore, according to the image capture apparatus 1, by reducing the differences in photographing conditions, only a difference in the movements of swings can be clearly displayed, and the state images can be compared with each other in an easy manner.

Next, another example of the normalization of images will be described.

Figure 8A:
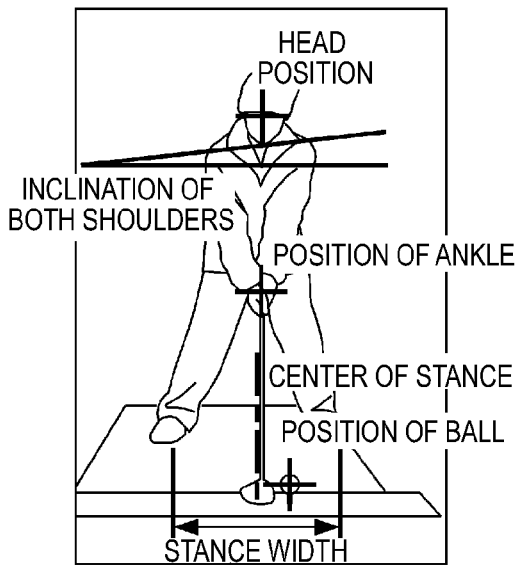
FIG. 8A is a diagram that illustrates an example of the normalization of an image.
Figure 8B:
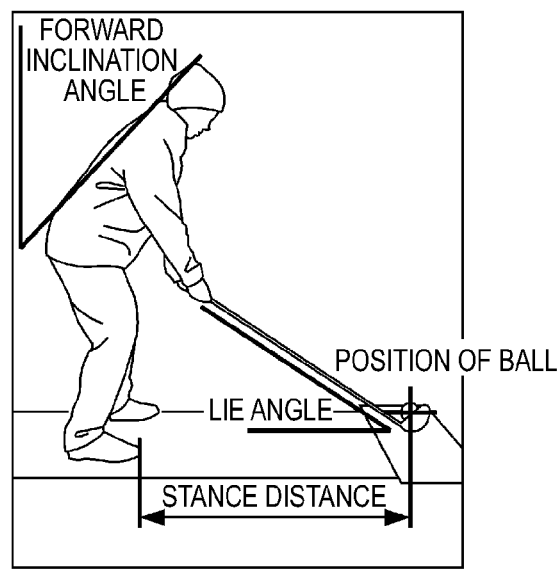
FIG. 8B is a diagram that illustrates an example of the normalization of an image.
Figure 8C:
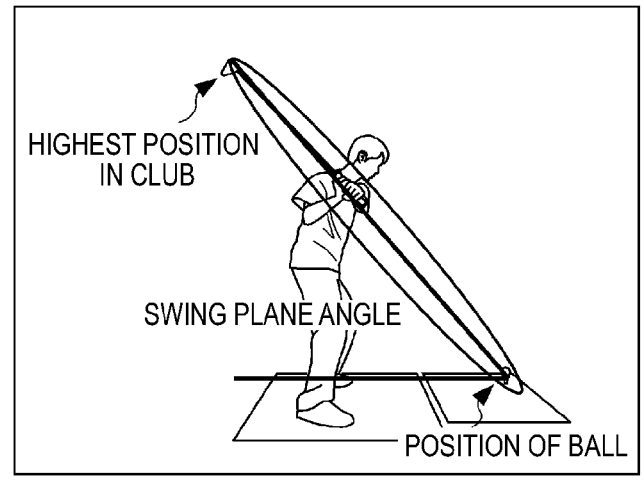
FIG. 8C is a diagram that illustrates an example of the normalization of an image.

FIGS. 8A to 8C are diagrams that illustrate an example of the normalization of images.

In the above-described embodiment, the normalization of images, for example, is configured such that the position of the target swinger is located in the center. In this example, the normalization of images from a viewpoint different from that of the embodiment described above will be described.

In the example in FIG. 8A, by making a correction to allow for the distance between the position of the head of the target swinger and the position of the ball to be a predetermined distance, even in cases where there are differences in photographing conditions or the physiques of the target swingers, a display can be made in which differences in the inclination of both shoulders, the position of the wrist, the center position of the stance, the width of the stance, and the like are clearly displayed.

In addition, when the display is made by displaying a histogram generated to include elements such as the inclination of both shoulders, the position of the wrist, the center position of the stance, and the width of the stance, such elements can be recognized by the user.

Furthermore, in a case where emphasizing a difference is desired, a correction for aggressively cutting out the portion that is desired to be emphasized is made. For example, in a case where the posture is desired to be emphasized, a portion not including the club head is cut out. In addition, in a case where a difference in the full swings is desired to be emphasized, the range of the transition of the club, in other words, a portion including the position of the club head in the address state and the highest position of the club head at the time of raising the club, is cut out.

FIG. 8B is a diagram that illustrates an example of the normalization of an image in a case where the target swinger is photographed from the rear face in a direction opposite to the flight path of the ball, instead of a moving image acquired by photographing from the front side, as described above.

In the example in FIG. 8B, a correction is made to allow for the distance (hereinafter, referred to as a "stance distance") between the position of the ball and the toe of the right foot of the target swinger to be predetermined. Accordingly, on the display screen, for example, differences in the forward inclination angle that is the inclination of the upper half body, a lie angle that is an angle formed by the center line of the shaft of the club and the ground, and the like can be indicated to be more distinguished.

In addition, when the display is made, by displaying a histogram generated to include elements such as the forward inclination angle and the lie angle, the differences can be recognized by the user more clearly.

Furthermore, as illustrated in FIG. 8C, by cutting out a portion near the right foot of the target swinger to include the top position of the club and the position of the ball, a display can be made in which the swing plane angle, representing the angle between the ground and the swing of the club, is distinguished.

When the display is made, by displaying a histogram generated to have an element, such as the swing plane angle, the differences can be recognized by the user.

Next, a technique for normalizing images in accordance with a user's operation will be described. In this example, an example will be described in which two normalized images are aligned to be displayed.

FIGS. 9 to 14 are schematic diagrams that illustrate examples of the technique for normalizing images.

In the case of FIG. 4, two state images are corrected using the absolute criterion. However, in the cases of FIGS. 9 to 14, a correction is made such that one image corresponds with the other image. In other words, the normalization process illustrated in FIGS. 9 to 14 can be regarded as the correcting of images through the use of a relative criterion.

In the examples illustrated in FIGS. 9 to 14, while two normalized images are aligned to be displayed, an image acquired by photographing a professional golfer is used as image A, displayed on the left side, and an image acquired by photographing an amateur is used as image B, displayed on the right side. The user normalizes the image of the amateur based on the image of the professional golfer. In other words, image B is corrected by reference to image A.

In addition, while the image to be used as the reference may be arbitrarily designated by the user, the image may be automatically designated by analyzing the image using the image analyzing unit 52 in FIG. 2. For example, an image with a superior head speed measurement result or the like, measured by analyzing the image, may be designated as the image to be used as the reference. In addition, by determining the name of the target swinger written in the header information or the like, an image of a specific person may be designated as the reference.

FIG. 9 is a diagram that illustrates a technique for normalizing an image by changing the inclination of the target swinger.

As the technique for normalizing an image, the user designates a line that passes through the toe included in image A through the input unit 18. By designating the line as such, as illustrated in FIG. 9, a broken line is formed.

When this broken line is checked in image B, it can be gleaned that there is a deviation between the broken line and the toe of the target swinger.

Since the broken line and the toe of the target swinger deviate from each other, the user designates both toes of the target swinger. Accordingly, as illustrated in FIG. 9, a thick line is formed. Next, the user designates an end portion of the thick line (in this embodiment, an end portion disposed on the left toe side on the broken line). Accordingly, the rotation center at the time of rotating the target swinger for normalization is determined. Finally, as the user performs an operation to execute the image normalization process, as illustrated on the lower side, a normalized image in which the toe of the target swinger in image B coincides with the broken line is generated.

In addition, when the normalized image is generated, as illustrated in image B, disposed on the lower side, it may be configured such that a numerical value indicative of a change in the angle is illustrated. Furthermore, in a case where the numerical value indicative of the change in the angle is displayed, it may be configured such that an auxiliary line, such as the broken line, is removed after the elapse of a predetermined time, and the numerical value indicative of the change in the angle is maintained to be displayed.

Figure 10:
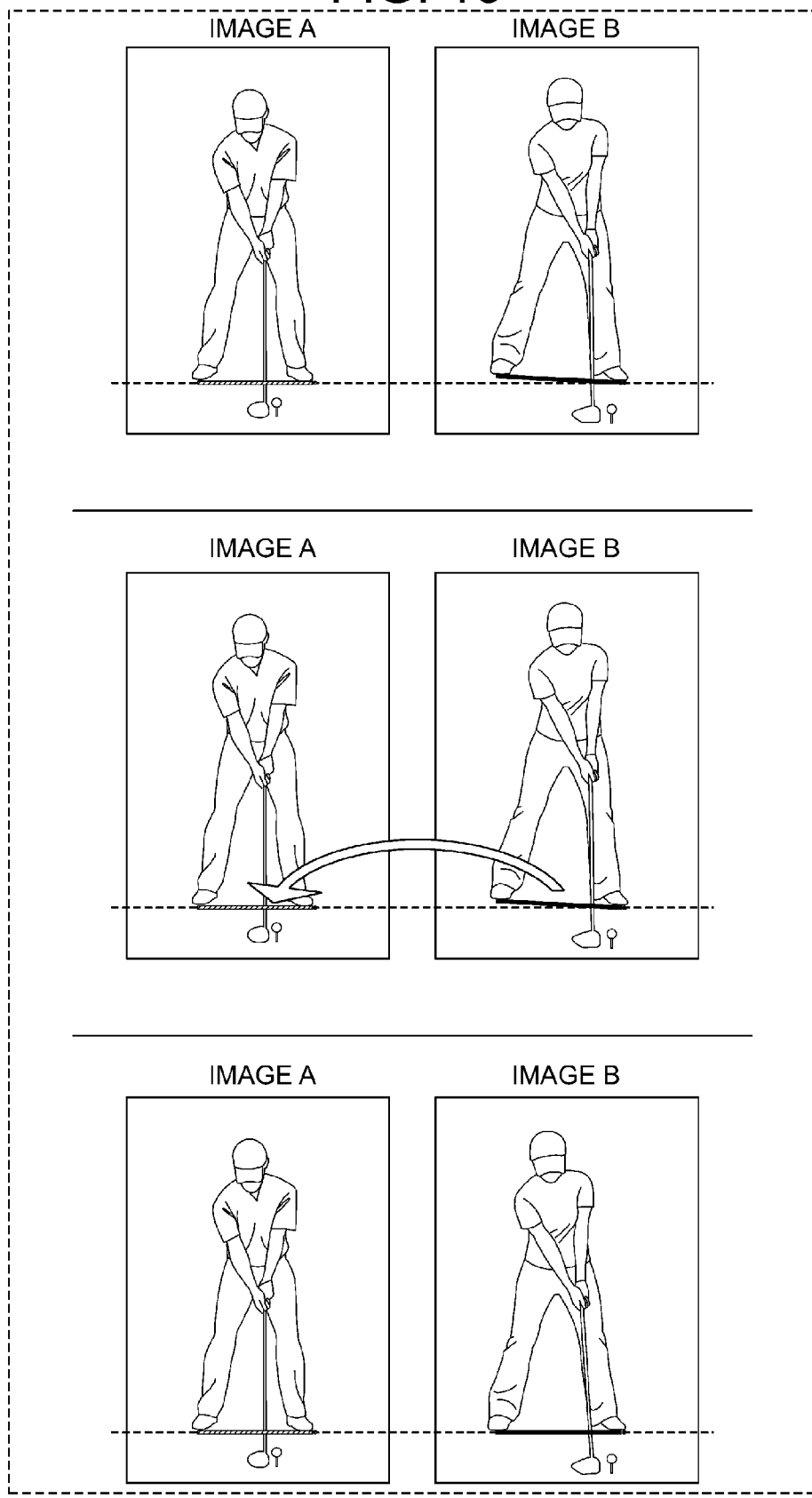
FIG. 10 is a schematic diagram that illustrates an example of a technique for performing the normalization of an image.

FIG. 10 is a diagram that illustrates another image normalization technique for changing the inclination of the target swinger.

In the example in FIG. 10, the inclination of the target swinger is changed, like it is in the example in FIG. 9. However, different from the example in FIG. 9, the image capture apparatus 1 is configured to perform the normalization process of an image by dragging and dropping the image.

In other words, in the example in FIG. 10, by designating both toes that are references for changing the angle and correcting the angle of the image of the target swinger included in image B to that of image A, the reference, a normalized image matching the angle of the target swinger in image A is generated. In addition, when the normalized image is generated, on the image B side in which the angle has been changed, a numerical value of the changed angle is displayed for a predetermined time.

FIG. 11 is a diagram that illustrates another image normalization technique for changing the inclination of the target swinger.

In the examples in FIGS. 9 and 10, while it is configured such that the angle is changed based on the inclined portion of the designated target swinger and the reference image, in the example in FIG. 11, the angle is changed by the user designating the degree of angle change in handwriting.

More specifically, after the portion of the inclination of the target swinger is designated, the degree of angle change is input by handwriting. Then, as the handwriting is recognized as text, the angle is changed. The recognition of the handwriting as text represents that the display of the handwriting is displayed as the text of a predetermined font.

Figure 12:
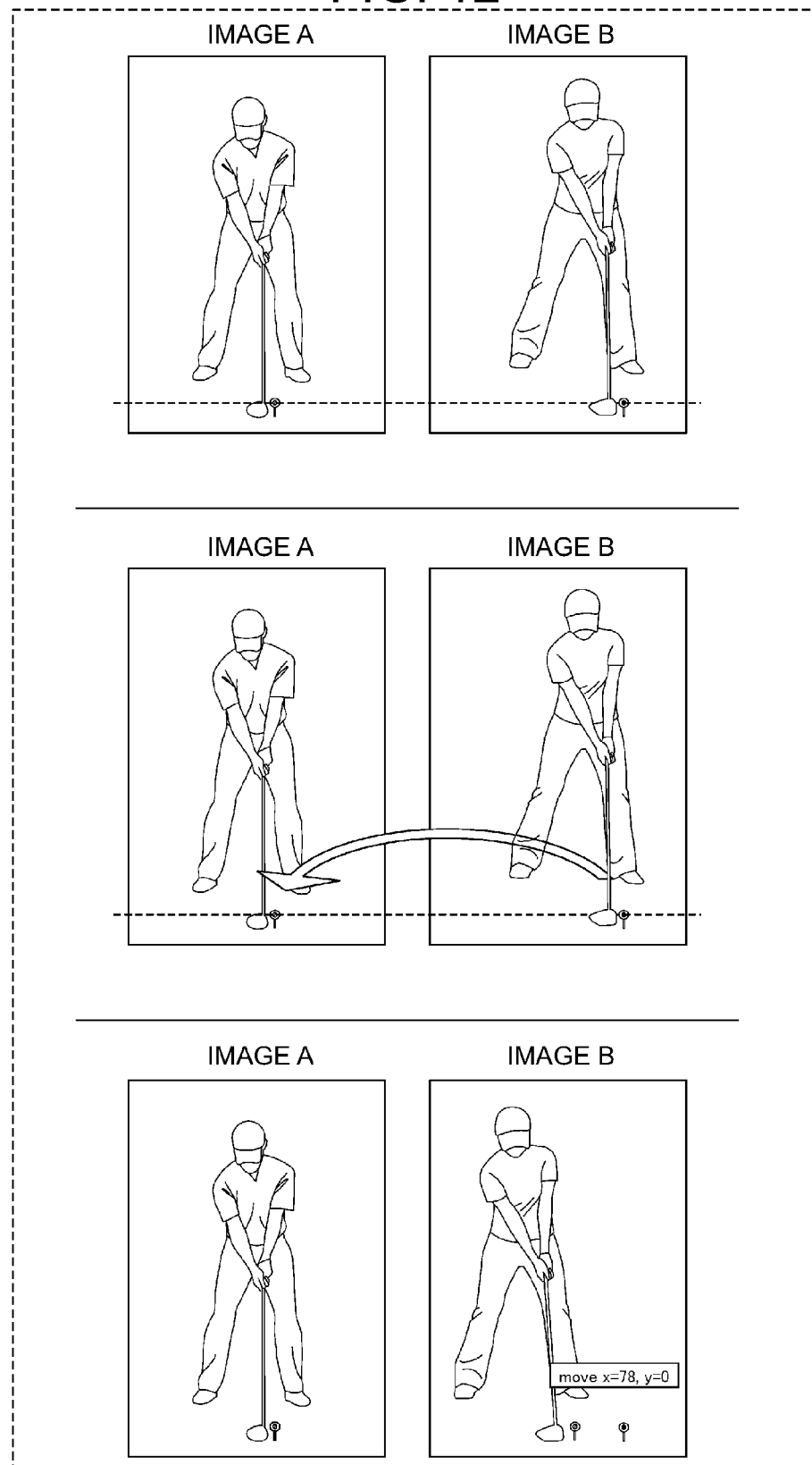
FIG. 12 is a schematic diagram that illustrates an example of a technique for performing the normalization of an image.

FIG. 12 is a diagram that illustrates an image normalization technique for changing the position of the target swinger.

In the example illustrated in FIG. 12, the position of the target swinger in image B is changed to have the same coordinates as those of the position of the target swinger with respect to the ball in image A, the reference.

More specifically, in a case where it is desired to move the target swinger to the same position as that in image A, with the position of the ball being in the center, the positions of the balls are designated in images A and B, and then the image of the target swinger in image B is moved to image A, whereby the position of the target swinger in image B will have the same coordinates as those in image A. At this time, the value of the amount of movement is displayed on image B for a predetermined period.

Figure 13:
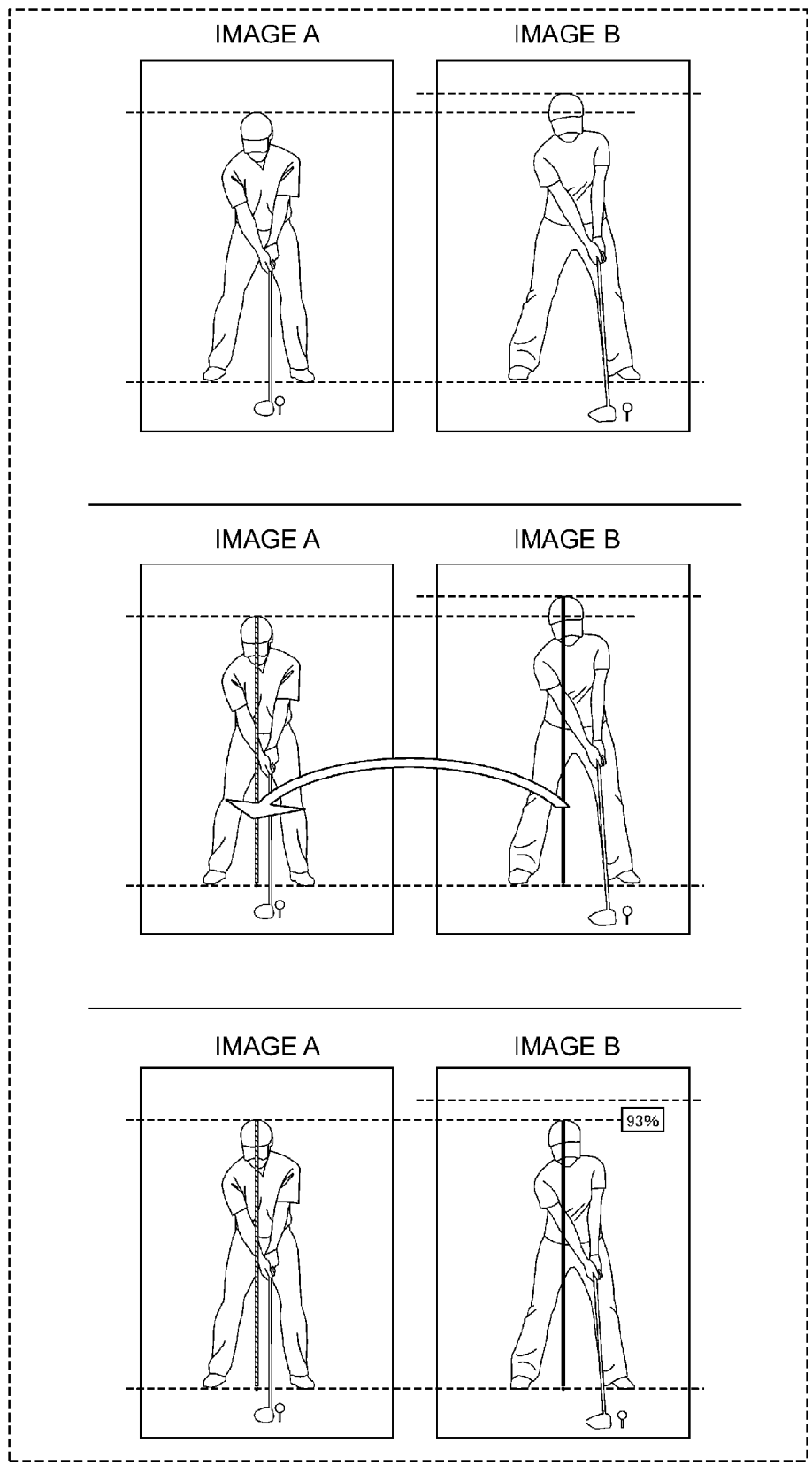
FIG. 13 is a schematic diagram that illustrates an example of a technique for performing the normalization of an image.

FIG. 13 is a diagram that illustrates an image normalization technique for changing the scale of the target swinger in the height direction.

In the case in FIG. 13, as denoted by the broken line on the upper side, in images A and B, the lengths from the toes to the heads of the target swingers are different. Thus, as illustrated in the middle side, portions (the head and the toe) for matching the length are designated, and, by moving the image of the target swinger included in image B to image A, the reference, normalized images in which the lengths from the toes to the heads of the target swingers coincide with each other, can be generated, as illustrated in the lower side. At this time, the scale rate of image B is displayed on image B for a predetermined time.

Figure 14:
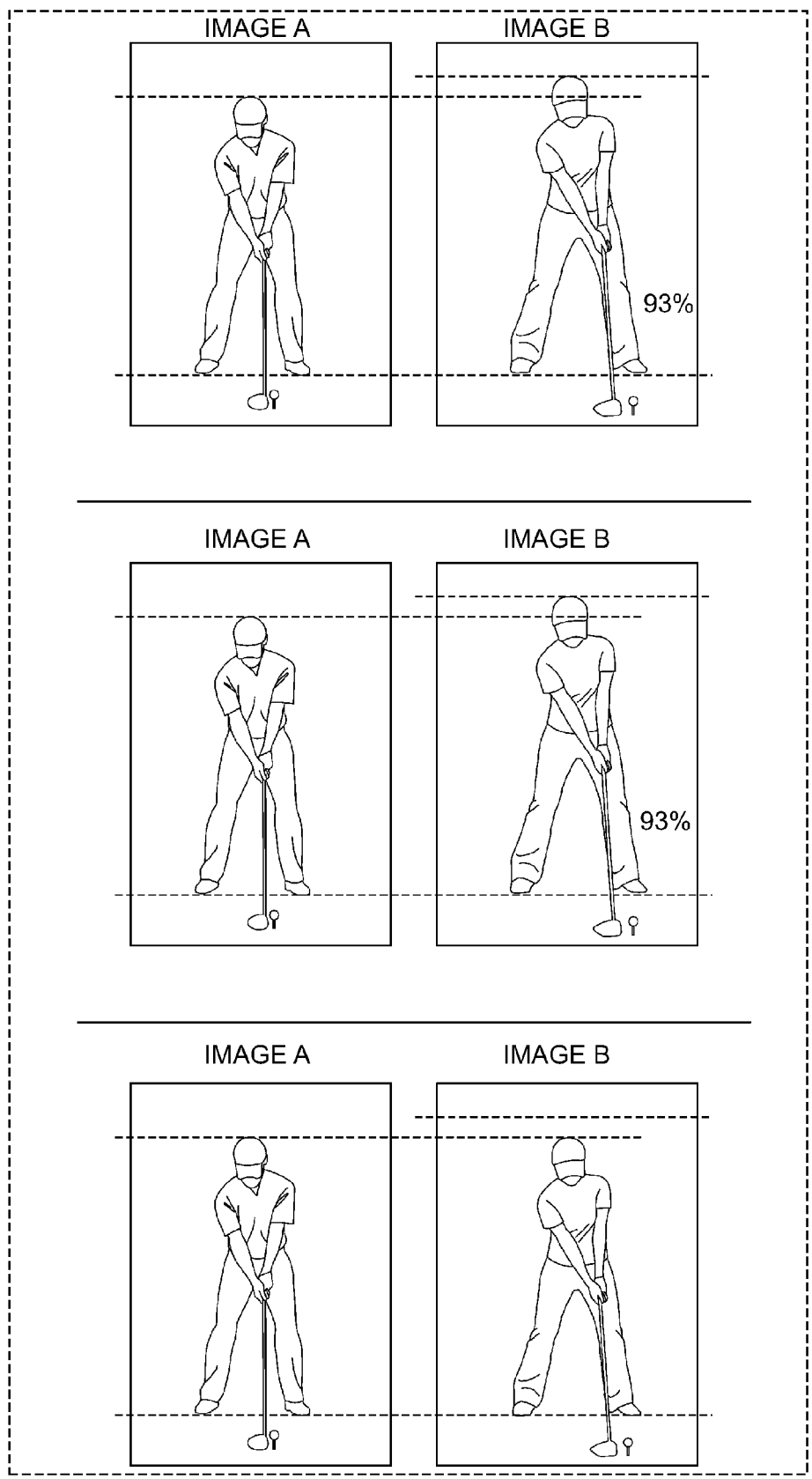
FIG. 14 is a schematic diagram that illustrates an example of a technique for performing the normalization of an image.

FIG. 14 is a diagram that illustrates another image normalization technique for changing the scale of the target swinger in the height direction.

The technique illustrated in FIG. 14 is the same as that illustrated in FIG. 11. After a portion that is desired to be scaled is designated, a scale rate is input by handwriting, and, by allowing the handwriting to be recognized as a text, the scale rate is changed. Recognition of the hand writing which is input as text is indicated in a distinguished manner by indicating the display of the handwriting input in a predetermined text font.

The image capture apparatus 1 configured as above is equipped with the normalization unit 54 and the display control unit 56.

The normalization unit 54 normalizes the area of at least one image out of a plurality of images.

The display control unit 56 displays a plurality of images, including the image normalized by the normalization unit 54, on the output unit 19.

Therefore, according to the image capture apparatus 1, the image acquired by normalizing the area of at least one image out of the plurality of images is displayed, and accordingly, the plurality of images can easily be compared with each other.

In addition, the normalization unit 54 performs normalization by correcting each image such that any one of the position, the size, and the angle of the area of each image of the plurality of images is any one of a position, a size, and an angle that are predetermined.

Therefore, according to the image capture apparatus 1, each image in which any one of the position, the size, and the angle of the area of the image is corrected to be one of the position, the size, and the angle that are predetermined, can be displayed on the output unit 19, whereby the plurality of images can easily be compared with each other.

In addition, the image capture apparatus 1 includes the image analyzing unit 52.

The image analyzing unit 52 specifies the area to be corrected on each image.

The normalization unit 54 corrects each image such that any one of the position, the size, and the angle of the area identified by the image analyzing unit 52 is any one of the position, the size, and the angle that are predetermined.

Therefore, according to the image capture apparatus 1, each image in which any one of the position, the size, and the angle of the area of the image is corrected to be one of the position, the size, and the angle that are predetermined, can be displayed on the output unit 19, whereby the plurality of images can easily be compared with each other.

In addition, the image capture apparatus 1 is equipped with the input unit 18.

The input unit 18 identifies the area of each image that is to be corrected in accordance with the user's operation that is detected by the input unit.

The normalization unit 54 corrects each image such that any one of the position, the size, and the angle of the area identified by the input unit 18 is any one of the position, the size, and the angle that are predetermined.

Therefore, according to the image capture apparatus 1, each image in which any one of the position, the size, and the angle of the area of the image is corrected to be one of the position, the size, and the angle that are predetermined, can be displayed on the output unit 19, whereby the plurality of images can easily be compared with each other.

In addition, the image capture apparatus 1 is equipped with the image analyzing unit 52.

The image analyzing unit 52 selects an image to be used as the reference from among a plurality of images.

The normalization unit 54 corrects the other images so they contain any one of the predetermined position, size, and angle of the image selected by the image analyzing unit 52.

In addition, in the image capture apparatus 1, a plurality of images are configured by using specific images acquired by extraction from the plurality of moving images.

Therefore, according to the image capture apparatus 1, the plurality of moving images can easily be compared with each other.

In addition, the image capture apparatus 1 is equipped with the histogram generating unit 55.

The histogram generating unit 55 generates a histogram that serves as an index for evaluating a moving image.

The display control unit 56 displays the histogram generated by the histogram generating unit 55 on the output unit 19, together with a plurality of images.

Therefore, by way of the image capture apparatus 1, an image that can be used for recognizing the characteristics of an image can be provided.

The display control unit 56 displays each image on the output unit 19 through the slide show display in which the display image is switched at a predetermined timing.

Therefore, by way of the image capture apparatus 1, a plurality of moving images can easily be compared with each other.

The display control unit 56 displays each image on the output unit 19 as a list display.

Therefore, by way of the image capture apparatus 1, a plurality of moving images can easily be compared with each other.

In addition, the CPU 11 acquires a plurality of moving images from the other apparatuses and the like through the image capture unit 17, the storage unit 20 (the moving image storing unit 71 in this embodiment), or the communication unit 21.

The normalization unit 54 normalizes each of the plurality of moving images acquired by the CPU 11.

The display control unit 56 displays each image that is normalized by the normalization unit 54.

Therefore, according to the image capture apparatus 1, a plurality of moving images among the acquired moving images can easily be compared with each other.

The present invention is not limited to the above-described embodiment, rather, the changes, improvements, and the like that can be achieved within the scope of the objective of the present invention also belong to the present invention.

In the above-described embodiment, although the generation of the histogram and the generation of normalized images are performed in the same period, the present invention is not limited thereto. Although the generation of the histogram and the generation of the normalized images may be sequentially performed as a moving image is stored, the generation of the histogram and the generation of the normalized images may also be performed at mutually different timings, in consideration of the processing load and the like. For example, various changes may be made therein, such as the case where the generation of the normalized images is performed at the time of acquiring a moving image, and the generation of the histogram is performed at the time of performing the slide show display.

In addition, in the above-described embodiment, although the normalized images are generated by performing normalization after the extraction of state images from a moving image, the present invention is not limited thereto. For example, it may be configured such that, at first, normalization is performed, and then, normalized images are generated by extracting state images from a moving image for which the normalization has been performed In addition, in the above-described embodiment, although the slide show display is configured to be performed for the normalized images that are extracted from each moving image, the present invention is not limited thereto. Thus, it may be configured such that each moving image is normalized, with the corresponding frame images being sequentially displayed.

In addition, in the above-described embodiment, a case has been described as an example in which normalization is performed by correcting image B by using image A as the reference. However, the present invention is not limited thereto. In other words, it may be configured such that normalization is performed by correcting a plurality of images, with image A being used as the reference, and image A and a plurality of the normalized images being aligned for display (list display). Accordingly, a plurality of images normalized by reference to one image can easily be compared with each other.

In addition, in the above-described embodiment, although the histogram uses the swing speed acquired by analyzing the moving image as a parameter, the present invention is not limited thereto. Rather, the histogram may have information acquired from a swing set as a parameter. Thus, for example, ball speed, head speed, smash factor (the ratio between the ball speed and the head speed), various stances (such as foot breadth), the position of the ball within left and right feet, or the ball-to-toe distance, dynamic lie angle, foreground angle, swing rhythm, horizontal distance between the ball and the ankle, horizontal distance between the ball and the head, swing plane angle, shoulder inclination angle (at the time of the address operation), swing rhythm, or the like can be used as the parameter.

In addition, in the above-described embodiment, although the histogram is configured to be displayed together with the slide image, the present invention is not limited thereto. For example, it may be configured such that the quality of the shots included in the stored moving images are denoted using icons, or in a way that swing advice is indicated using text or the like.

Furthermore, in the above-described embodiment, although normalized images generated from frame images, including predetermined operations in a retrieved moving image, are sequentially displayed along the time axis as the slide show display, the present invention is not limited thereto. The normalized images are not limited to the frame images that include predetermined operations, rather, they may also be configured to be generated from frame images that configure a moving image. In such case, in the display, a moving image acquired by normalizing all the frame images is displayed.

In addition, as the display form, to provide an example, it may be considered that frame images of normalized moving images are synchronized to be displayed in a display area, such as the field 101 of the "list display" in FIG. 3. In addition, as the normalization technique, the technologies corresponding to FIGS. 9 to 14 may be applied.

Furthermore, any display form may be employed as long as the images are displayed for comparison with each other. For example, one image that has been selected may be displayed in a switched manner, a plurality of images may be displayed as a list, two images may be displayed in parallel with each other, or a plurality of images may be displayed in an overlapping manner. Moreover, in the case where a plurality of images are displayed, the images may be configured to be displayed with the same size. Alternatively, a display may be configured to be made in which, for example, a "master"-"subordinate" relation is applied to each image. For example, an image having a superior result is displayed to be as large in size as the "master", and the other image is displayed as the "subordinate" in a size that is smaller than that of the "master" image.

In addition, as to the timing of the display, although images are configured to be displayed at predetermined timings, the present invention is not limited thereto. For example, a display of portions corresponding to the spots that are desired to be compared with each other may be configured to be delayed in an emphasizing manner, or, in the case where a display is made in a comparable manner, a portion having a large difference may be displayed with a delay in an emphasizing manner. In addition, the emphasizing display is not limited to the arrangement of a difference in display speed, but, for example, an emphasizing display acquired by changing the color of the image's periphery or the like may be configured to be performed. Furthermore, when the emphasizing display is performed, the display target is determined using the result of the analysis of images, information registered in advance, or the like.

In addition, in the above-described embodiment, although the generation of normalized images is configured to be performed after determination of the target to be displayed, the present invention is not limited thereto. The generation of normalized images may be configured to be performed in advance before the determination of the target to be displayed, for example, after the acquisition of a moving image. Through such a configuration, the process dependent on the display and the process dependent on the generation of images can be distributed. Accordingly, the response time required for the display can be shortened. On the other hand, by generating the images after the determination of the targets to be displayed, target images that are not targets of display are not processed, and the generated images are not required to be maintained. Therefore, the memory load can be reduced.

The above-described series of processes may be performed either by hardware or by software.

In other words, the functional configuration indicated in FIG. 2 is merely an example, and the present invention is not particularly limited thereto. In other words, it is sufficient if a function for performing the above-described series of processes as a whole is included in the image capture apparatus 1. Moreover, the functional blocks to be used for realizing this function are not particularly limited to the example indicated in FIG. 2.

In addition, a functional block may be configured solely by hardware, solely by software, or by a combination of both software and hardware.

In a case where the series of processes is performed by software, a program configuring the software is installed to a computer or the like from a network or a storage medium.

The computer may be a computer that is built in dedicated hardware. In addition, the computer may be a computer capable of executing various functions by installing various programs thereto, for example, a general-purpose personal computer.

A storage medium including such a program is configured not only by the removable medium 31 in FIG. 1 which is distributed separately from the apparatus's main body for provision to users, but also by a storage medium or the like that is provided to users, in a state of being incorporated in the apparatus's main body in advance. The removable medium 31, for example, is configured by a magnetic disk (including a floppy disk), a Blu-ray disc, an optical disc, a magneto-optical disk, or the like. For example, the optical disc is configured by a compact disk-read only memory (CD-ROM), a digital versatile disk (DVD), a Blu-ray disc (BD), or the like. The magneto-optical disk is configured by a Mini-Disk (MD) or the like. In addition, the storage medium that is provided to the user in advance during construction of the main body of the apparatus, for example, is configured by the ROM 12 in FIG. 1 in which a program is recorded, a hard disk is included in the storage unit 20 in FIG. 1, or the like.

Furthermore, in the description presented here, the steps describing a program recorded on a storage medium not only include processes performed over a series of time in accordance with the sequence thereof, but also include processes that are not necessarily performed over a series of time, but are performed in a parallel manner or individually.

As above, several embodiments of the present invention have been described. However, such embodiments are merely examples and are not for purposes of limiting the technical scope of the present invention. The present invention may take other various embodiments, and various changes, such as an omission, substitution, and the like may be made in a scope that does not deviate from the concept of the present invention. These embodiments and modifications thereof are included in the scope or the concept of the invention described here and are included in the invention described in the claims and the scope equivalent thereto.

What is claimed is:

1. A display control apparatus comprising:
a processor which is configured to:
acquire first images including a sequence of motions of a first subject;
specify a region of the first subject from one of the first images in accordance with a specifying operation by a user;
normalize a predetermined image based on the region of the first subject;
generate, as an index, histogram information by analyzing specific areas of the images; and
display the histogram information together with the normalized image on a display.

2. The display control apparatus according to claim 1, wherein the processor is further configured to:

acquire second images including a sequence of motions of a second subject; and perform control to display the predetermined image which has been normalized on the display, wherein the predetermined image includes one of the first images or one of the second images.

3. The display control apparatus according to claim 2, wherein the processor is further configured to:

normalize such that at least one of a position, a size, and an angle of the one of the first images or the one of the second images matches a position, a size, or an angle that is predetermined.

4. The display control apparatus according to claim 2, wherein the processor is further configured to:

identify the one of the first images or the one of the second images to be normalized in accordance with a user operation, wherein the processor normalizes the identified image such that at least one of a position, a size, and an angle of the identified image matches a position, a size, or an angle that is predetermined.

5. The display control apparatus according to claim 2, wherein the processor is further configured to:

select one of the first images or one of the second images to be used as a reference, wherein the processor performs normalizing by using the selected one image as the reference.

6. The display control apparatus according to claim 5, wherein the processor corrects the images among the first images and the second images other than the selected one image such that the images match at least one of a position, a size, and an angle of the selected one image.

7. The display control apparatus according to claim 2, wherein the processor normalizes the one of the first images or the one of the second images including a predetermined posture of the first subject or the second subject.

8. The display control apparatus according to claim 2, wherein the processor is further configured to:

analyze the sequences of motions of the first subject and the second subject in the first images and the second images, wherein the processor normalizes images from the first images and the second images other than an image having a predetermined posture based on an analysis result.

9. The display control apparatus according to claim 2, wherein the processor is further configured to:

identify a predetermined posture from the sequences of motions in the first images and the second images, wherein the processor normalizes images from the first images and the second images other than an image having the predetermined posture based on an image having the predetermined posture.

10. The display control apparatus according to claim 2, wherein the processor normalizes images from the first images and the second images respectively or normalizes at least one moving image comprising a plurality of images including a sequence of motions.

11. The display control apparatus according to claim 2, wherein the processor is further configured to:

specify the region of the first subject, wherein the region is common to the first images and the second images.

12. The display control apparatus according to claim 2, wherein the processor is further configured to:

normalize the predetermined image which includes a specific posture of the sequence of motions of the second images based on the region of the first subject; and perform control to display the predetermined image which includes the specific posture of the sequence of motions on the display.

13. The display control apparatus according to claim 1, wherein the sequence of motions includes a golf swing motion.

14. The display control apparatus according to claim 1, wherein the processor is further configured to:

specify the region which is smaller than a whole of a region of the first subject.

15. A display control method comprising:

acquiring first images including a sequence of motions of a first subject;

specifying a region of the first subject from one of the first images in accordance with a specifying operation by a user;

normalizing a predetermined image based on the region of the first subject;

generating, as an index, histogram information by analyzing specific areas of the images; and displaying the histogram information together with the normalized image on a display.

16. A non-transitory computer readable medium having stored thereon a program that is executable by a computer to perform functions comprising:

acquiring first images including a sequence of motions of a first subject;

specifying a region of the first subject from one of the first images in accordance with a specifying operation by a user;

normalizing a predetermined image based on the region of the first subject;

generating, as an index, histogram information by analyzing specific areas of the images; and displaying the histogram information together with the normalized image on a display.

17. A display control apparatus comprising:

a processor which is configured to:

acquire first images including a sequence of motions of a first subject;

specify a region of the first subject from one of the first images in accordance with a specifying operation by a user;

identify a predetermined posture from the sequence of motions in the first images; and normalize a predetermined image from the first images other than an image having the predetermined posture based on the region of the first subject.

18. The display control apparatus according to claim 17, wherein the processor is further configured to:

acquire second images including a sequence of motions of a second subject; and perform control to display the predetermined image which has been normalized on a display.

* * * * *